United States Patent
Wong et al.

(10) Patent No.: US 7,800,783 B2
(45) Date of Patent: Sep. 21, 2010

(54) AUTO WHITE BALANCING BY MODIFIED GREY WORLD AND GEOMETRIC DISTORTION MEASUREMENT

(75) Inventors: Hon Wah Wong, Kwun Tong (HK); Kar Kin Edwin Lee, Tin Shui Wai, N.T. (HK)

(73) Assignee: Hong Kong Applied Science and Technology Research Institute Co. Ltd., Shatin (HK)

( * ) Notice: Subject to any disclaimer, the term of this patent is extended or adjusted under 35 U.S.C. 154(b) by 619 days.

(21) Appl. No.: 11/753,687

(22) Filed: May 25, 2007

(65) Prior Publication Data
US 2008/0291475 A1   Nov. 27, 2008

(51) Int. Cl.
H04N 1/40   (2006.01)
(52) U.S. Cl. .................. 358/2.1; 358/516; 348/223.1
(58) Field of Classification Search .................. 358/1.9, 358/2.1, 500–504, 516–520, 527; 348/223.1–225.1, 348/655, 690
See application file for complete search history.

(56) References Cited

U.S. PATENT DOCUMENTS

| | | | |
|---|---|---|---|
| 6,573,932 B1 | 6/2003 | Adams | |
| 6,727,942 B1 | 4/2004 | Miyano | |
| 6,791,606 B1 | 9/2004 | Miyano | |
| 6,975,759 B2 | 12/2005 | Lin | |
| 7,580,021 B2 * | 8/2009 | Morita | 345/88 |
| 2003/0001958 A1 | 1/2003 | Hoshuyama | |
| 2004/0212691 A1 | 10/2004 | Sato | |
| 2005/0270383 A1 | 12/2005 | Hung | |

* cited by examiner

Primary Examiner—Thomas D Lee
Assistant Examiner—Stephen M Brinich
(74) Attorney, Agent, or Firm—Occhiuti Rohlicek & Tsao LLP

(57) ABSTRACT

A method, apparatus and computer program product for correcting white balance in a digital image are described. The method comprises determining a number of grey blocks in the digital image (s102), each block comprising a subset of pixels of the image, and if the number of grey blocks is less than a predetermined value, scaling one or more color channels of the digital image using a first gain value to generate a first intermediate image (s201A) and scaling one or more color channels of the digital image using a second gain value to generate a second intermediate image (s201B). A number of grey blocks in each of the first and second intermediate images (s202A, s202B) is determined and the gain value resulting in the intermediate image having a greater number of grey blocks is set as the reference gain value (s203). A grey world process is performed on the intermediate image having a greater number of grey blocks (s205). Also described are a method, apparatus and computer program product for computing gain values for correcting a white balance of a digital image. The method comprises receiving an image divided into a number of blocks, removing the three most frequently occurring colors from the image (s204), and scaling one or more color channels of the image by respective reference gain values derived by a grey world process performed on the image.

17 Claims, 7 Drawing Sheets

AUTO WHITE BALANCING BY MODIFIED GREY WORLD AND GEOMETRIC DISTORTION MEASUREMENT

TECHNICAL FIELD

The disclosed invention relates generally to image correction in digital images, and in particular to correcting a white balance of a digital image.

SUMMARY

According to an aspect of the invention, a method of adjusting white balance in a digital image comprises the steps of determining a number of grey blocks in the digital image according to a geometric distortion criteria, each block comprising a subset of the plurality of pixels of the image, and if the number of grey blocks is less than a predetermined value, processing the digital image to generate an intermediate image. The method further composes determining a number of grey blocks in the intermediate image according to a geometric distortion criteria, and scaling one or more colour channels of the intermediate image by respective reference gain values derived in accordance with a grey world process.

According to another aspect of the invention, a method for computing one or more gain values for correcting a white balance of a digital image comprises receiving an image comprising a number of logical blocks, each block including a plurality of pixels, removing the three most frequently occurring colours from the image, and scaling one or more colour channels of the image by respective reference gain values derived by a grey world process.

According to another aspect of the invention, an apparatus for correcting white balance in a digital image comprises means for determining a number of grey blocks in the digital image according to a geometric distortion criteria, each block comprising a subset of the plurality of pixels of the image, said number of determined blocks being less than a predetermined value, processing means for generating an intermediate image, means for determining a number of grey blocks in the intermediate image according to a geometric distortion criteria, scaling means for scaling one or more colour channels of the intermediate image by respective reference gain values derived in accordance with a grey world process performed on the intermediate image, and means for applying the respective reference gain values to the intermediate image, whereby an image with a corrected white balance is obtained.

According to another aspect of the invention, a computer program product for correcting white balance in a digital image comprises code for determining a number of grey blocks in the digital image according to a geometric distortion criteria, each block comprising a subset of the plurality of pixels of the image, said number of determined blocks being less than a predetermined value, code for processing the digital image to generate an intermediate image, code for determining a number of grey blocks in the intermediate image according to a geometric distortion criteria, code for scaling one or more colour channels of the intermediate image by respective reference gain values derived in accordance with a grey world process performed on the intermediate image, and code for applying the respective reference gain values to the intermediate image, whereby an image with a corrected white balance is obtained.

According to another aspect of the invention, an apparatus for computing one or more gain values for correcting a white balance of a digital image comprises means for receiving an image divided in a number of blocks, each block including a plurality of pixels, means for removing the three most frequently occurring colours from the image, and means for scaling one or more colour channels of the image by respective reference gain values derived by a grey world process performed on the image.

According to another aspect of the invention, a computer program product for computing one or more gain values for correcting comprises code for receiving an image divided into a number of blocks, each block including a plurality of pixels, code for removing the three most frequently occurring colours from the image, and code for scaling one or more colour channels of the image by respective reference gain values derived by a grey world process performed on the image.

BRIEF DESCRIPTION OF THE DRAWINGS

Embodiments of the disclosed invention are described with reference to the drawings, in which.

DETAILED DESCRIPTION

A method, apparatus and computer program product for correcting white balance in a digital image are described hereinafter. The method involves a modified grey world process particularly suited for processing an image in which a number of grey blocks in the image is low. A geometric distortion criteria is used to detect grey blocks in the image, and gain values for correcting the white balance of the image are determined by a grey world process and applied to the image. The gain values may be further refined by additional processes before being applied to the image. Further described herein are a method, apparatus and computer program product for computing one or more gain values for correcting a white balance of a digital image.

As a grey world assumption typically provides incorrect white balancing of images when large objects are present in the image (due to the colour of the large objects dominating the average intensity of corresponding colour channels), it is further suggested herein to suppress the effects of large objects in images to provide a more accurate white balancing setting. White balance settings can then be refined by referencing average Red, Blue, and Green intensities of the grey objects to compute an optimal white balance setting.

Figure 1:
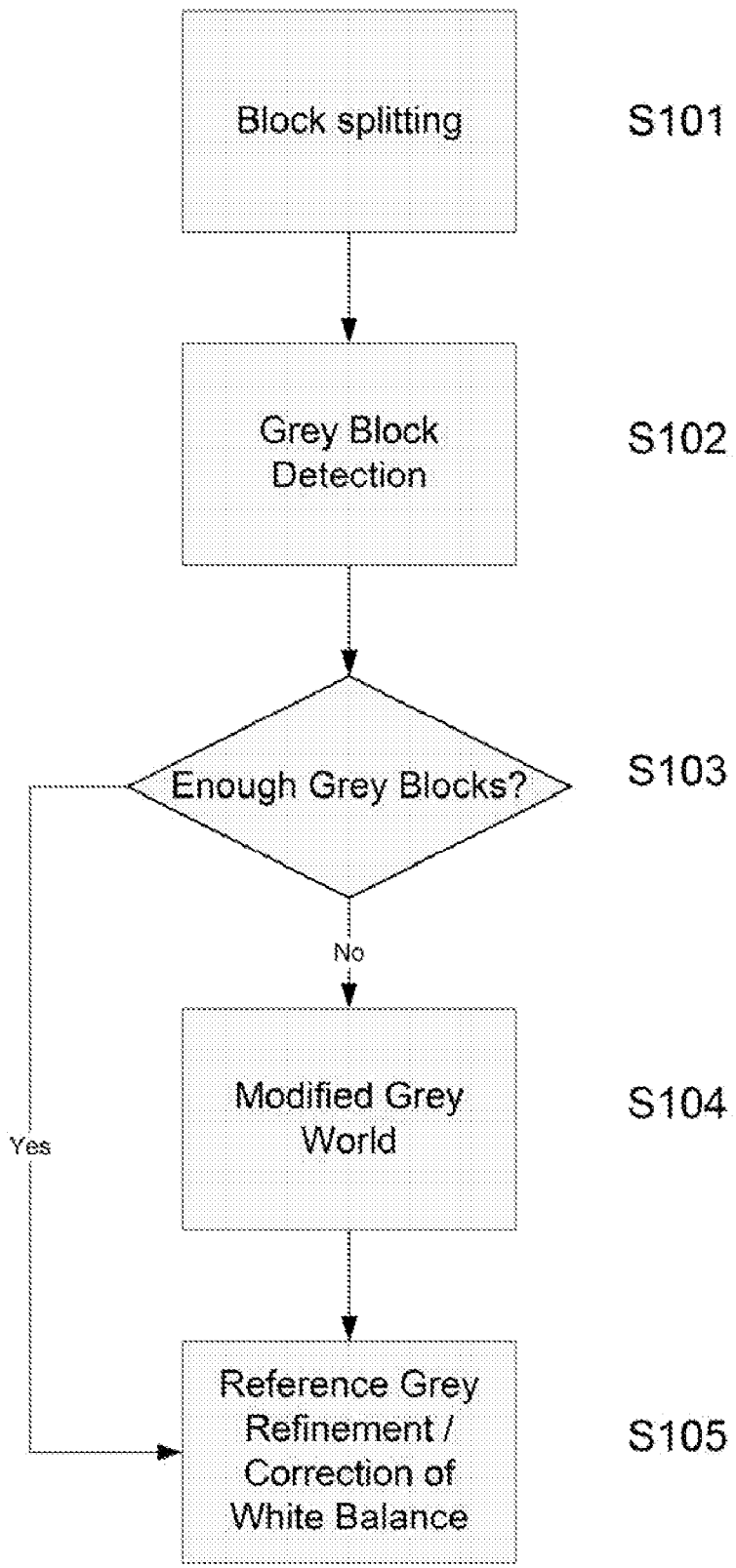
FIG. 1 is a flow diagram illustrating an overview of a white balance correction process.

FIG. 1 is a flow diagram illustrating an overview of the white balance correction process of the disclosed invention.

At step s101, a digital image to be corrected is split into a plurality of blocks. The size of each block may be dependent on factors such as processor capability, desired complexity and accuracy of auto white balance estimation, noise level, and the like. Each block is analysed at step s102 according to the following geometric distortion criteria to determine if the block can be considered a grey block:

$$\left|\frac{G}{R}-1\right|+\left|\frac{G}{B}-1\right|\le T_g.$$

Here R, G, and B are the accumulated (or average) intensities of R, G, and B pixels respectively for each block, and $T_g$ is empirically determined. A block is considered to be grey if the above criteria is satisfied.

The number of grey blocks of the image is calculated at step s103. If the number of grey blocks satisfies a predetermined threshold, the method proceeds to step s105 where reference grey refinement is performed. If however, the number of grey blocks in the digital image does not satisfy the predetermined threshold, a modified grey world process is first performed on the digital image (s104) before performing the reference grey refinement process. The modified grey world process generates gain values $R_{gain}$ and $B_{gain}$ and scales the R and B channels of the digital image by these gain values to generate an intermediate image.

The above predetermined threshold is empirically determined, and is dependent on the colour performance and colour sensitivity of image sensors in use. Too high a threshold results in false candidates being included in subsequent processes, whereas too low a threshold results in potential candidates being excluded, both of which may degrade the accuracy of the white balance correction.

The reference grey refinement process generates and/or refines gain values $R_{gain}$ and $B_{gain}$, and scales the colour channels of the original image (in the case where the modified grey world process was not performed) or an intermediate image (in the case where the modified grey world process was performed) to produce an image having a corrected white balance.

Figure 2:
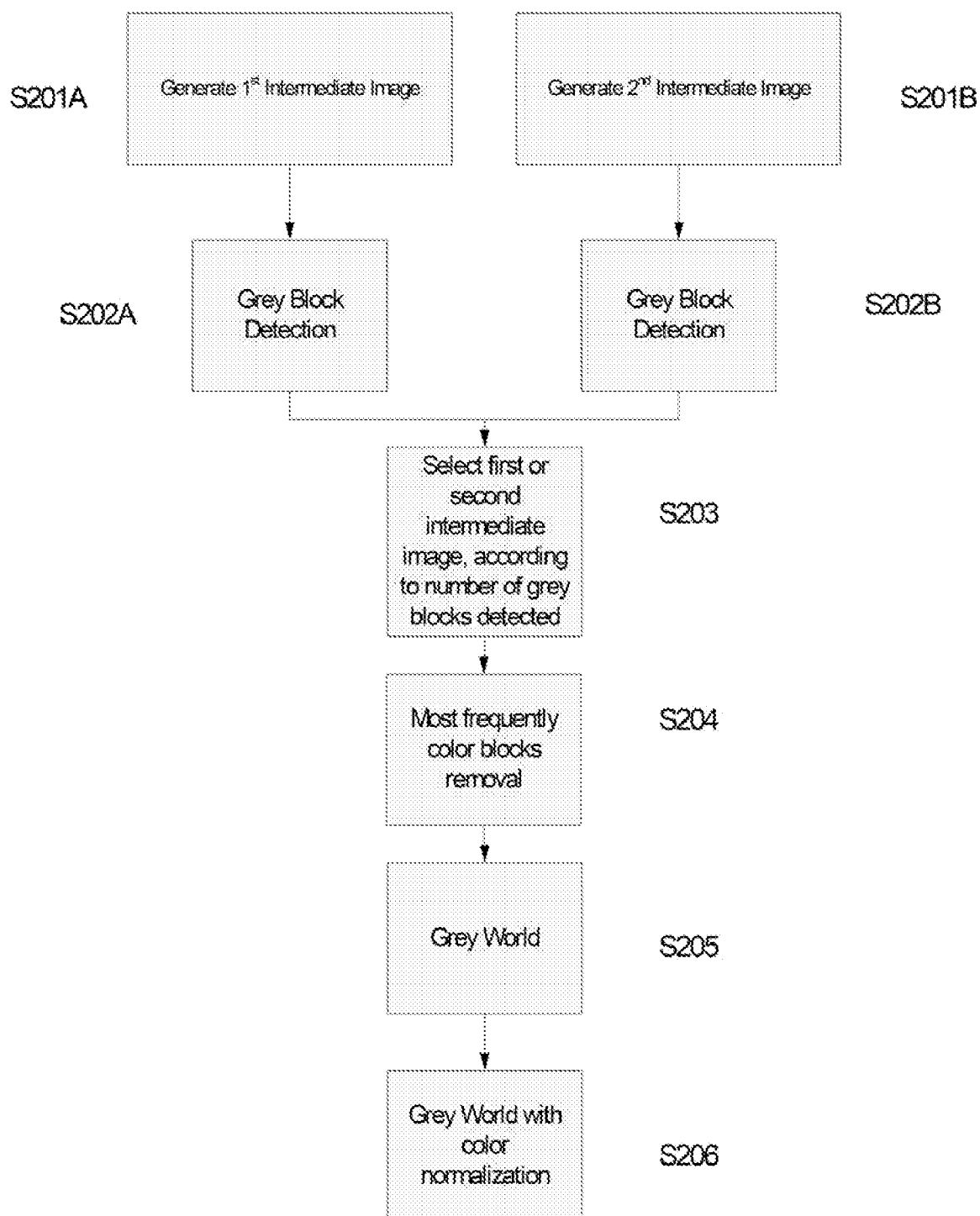
FIG. 2 is a flow diagram illustrating an overview of a modified grey world process.

FIG. 2 provides an overview of the modified grey world process performed at step s104. In the modified grey world process, two sets of values of $R_{gain}$ and $B_{gain}$ are applied to respective colour channels of the image to generate two intermediate images.

At step s201A, the R and B channel of the image are respectively scaled by first gain values $R_{gain}$ and $B_{gain}$ calculated as follows:

$$B_{gain} = \frac{\text{median}(G_i)}{\text{median}(B_i)},$$
$$R_{gain} = \frac{\text{median}(G_i)}{\text{median}(R_i)}.$$

Here $R_i$ is the accumulated value of an R channel of the image, $G_i$ is the accumulated value of a G channel of the image, and $B_i$ is the accumulated value of a B channel of the image. A first intermediate image is generated as a result of the above scaling of the original image.

At step s201B, the R and B channels of the image are scaled respectively scaled by second gain values $R_{gain}$ and $B_{gain}$ calculated as follows:

$$B_{gain} = \frac{\text{mean}(G_i)}{\text{mean}(B_i)},$$
$$R_{gain} = \frac{\text{mean}(G_i)}{\text{mean}(R_i)}.$$

Here $R_i$ is the accumulated value of an R channel of the image, $G_i$ is the accumulated value of a G channel of the image, and $B_i$ is the accumulated value of a B channel of the image. A second intermediate image is generated as a result of the above scaling of the original image.

At steps s202A and s202B, grey block detection is performed on each of the first and second intermediate images and the number of grey blocks of each intermediate image calculated. The intermediate image having the greater number of grey blocks is selected for further image processing (s203).

At step s204, a method of computing the gain values for correcting the white balance of the digital image is commenced. A number of most frequently occurring colour blocks is removed from the selected intermediate image, and at step s205 a grey world process is performed on the intermediate image to generate reference gain values $R_{gain}$ and $B_{gain}$. $R_{gain}$ and $B_{gain}$ are generated from the intermediate image as follows:

$$B_{gain} = \frac{\text{median}(G_i)}{\text{median}(B_i)},$$
$$R_{gain} = \frac{\text{median}(G_i)}{\text{median}(R_i)}.$$

where $R_i$ is the accumulated value of an R channel of the intermediate image, $G_i$ is the accumulated value of a G channel of the intermediate image, and $B_i$ is the accumulated value of a B channel of the intermediate image. A colour normalization process is preferably subsequently performed at step s206, upon completion of which the modified grey world process ends.

In performing a further grey world process on the intermediate image preferably having a number of most frequently occurring colour blocks first removed, a more accurate estimate of the optimal white balance setting can be obtained before the colour normalization process is performed.

Figure 3:
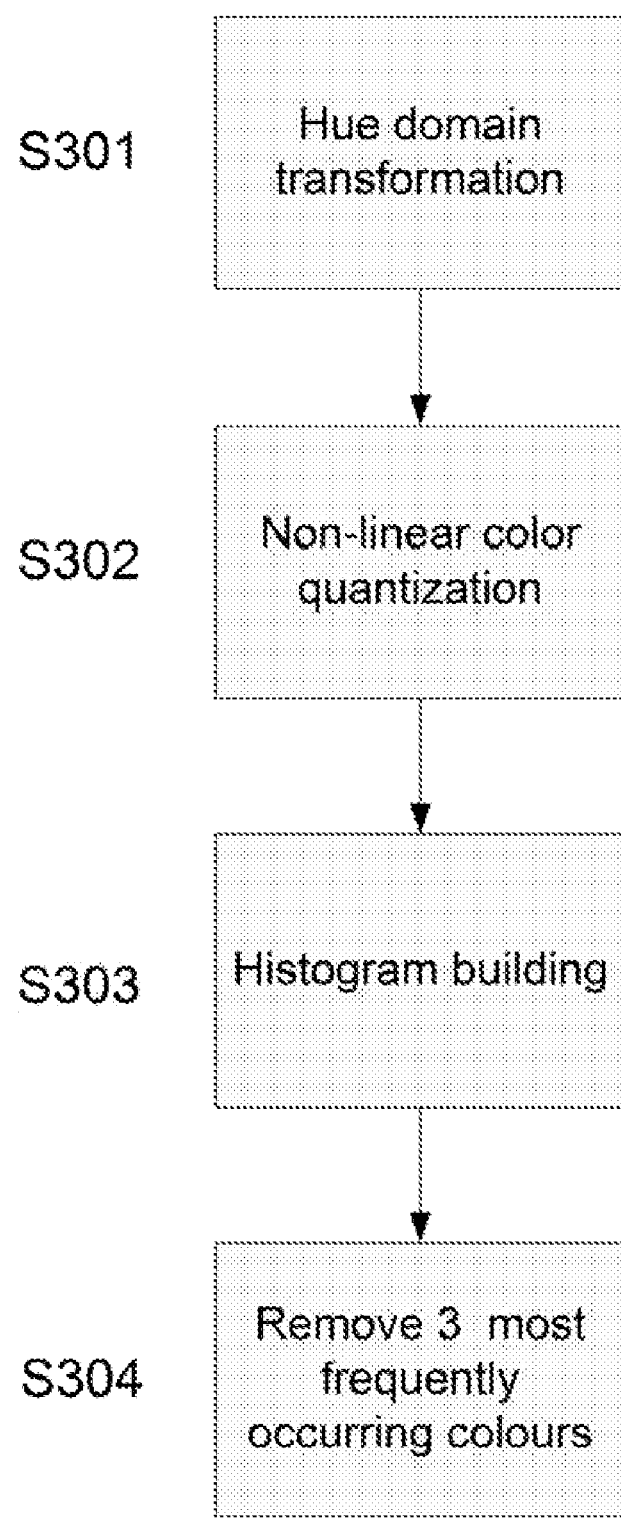
FIG. 3 is a flow diagram of a colour removal process.

Removal of the most frequently occurring colour blocks is described with reference to FIG. 3. At step s301, all blocks of the digital image are transformed to the hue domain. An effect of this transformation is a reduction in the effect of colour saturation. Non-linear quantization is next performed at step s302 to equalize the hue domain. Non-linear quantization improves the relative resolution of yellow, cyan, and magenta compared to linear quantization. At step s303, a histogram is generated, whereby the frequency of occurrence of each colour is ascertained. In the present example, the three most frequently occurring colours are preferably removed since blocks of the same colour do not contain additional useful information for spectrum estimation, and may reduce the accuracy of white balance correction. It should be understood, however, that any number of the most frequently occurring colours may be removed, as most appropriate for the digital image being processed, and or effect desired to be obtained.

Figure 4:
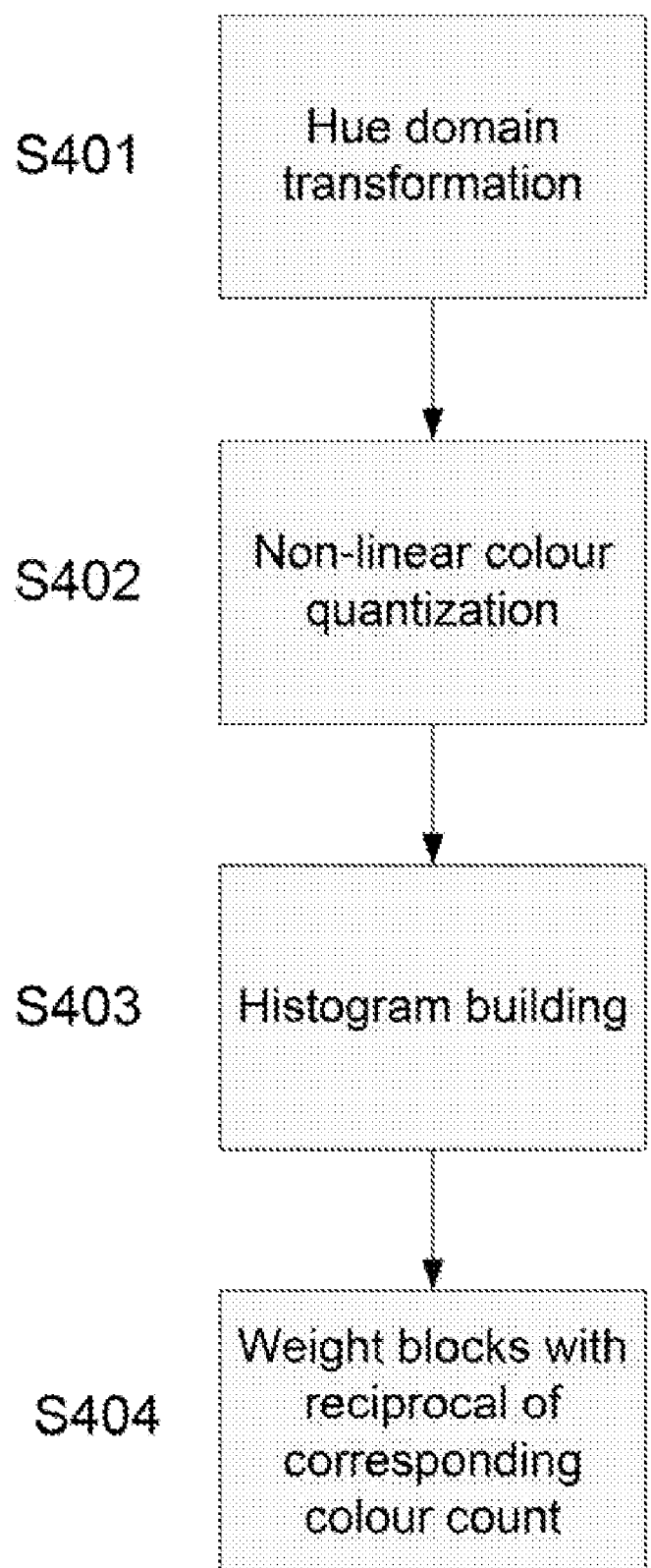
FIG. 4 is a flow diagram of a colour normalization process.

The colour normalization process at step s206 is described with reference to FIG. 4. Steps s401 to s403 of FIG. 4 are similar to those of steps s301 to s303, and descriptions thereof are hence omitted. At step 404, a weighting factor $W_i$ is calculated and used to group blocks of the same quantized colour into one logical block. In this manner, blocks of the same colour are normalized into one block, resulting in a higher colour variation. As the effectiveness of the grey world process depends on an amount of variation in colour, the colour normalization process positively affects the accuracy of the white balance correction.

The weighting factor $W_i$ is calculated as follows:

$$W_i = \frac{1}{H(C_i)},$$

where $H(C)$ is the count of colour C, and $C_i$ is the quantized colour of block i.

The weighting factor $W_i$ is applied to the reference gain factors, $B_{gain}$ and $R_{gain}$ as follows:

$$B_{gain} = \frac{\sum_{\forall i} W_i G_i}{\sum_{\forall i} W_i B_i}$$

$$R_{gain} = \frac{\sum_{\forall i} W_i G_i}{\sum_{\forall i} W_i R_i}$$

Upon completion of the modified grey world process, the white balance correction process proceeds to block s105 of FIG. 1. As shown in FIG. 1, a process of reference grey refinement is performed at step s105. The reference grey refinement process, which generates and/or corrects reference gain values $B_{gain}$ and $R_{gain}$ with which to correct a white balance, is performed after the modified grey world process 200 in the case where the number of grey blocks in the original image was insufficient. The reference grey refinement process is performed without first performing the modified grey world process if the number of grey blocks in the original image was sufficient. The reference grey refinement process is described with reference to FIG. 5.

The reference grey refinement process begins with a detection of grey blocks at step s501 if the modified grey world process (s104) was performed. If the modified grey world process was not performed, this step of detecting grey blocks may be skipped, and the reference grey refinement process commenced from step s502. Luminance weights and grey weights are computed at step s502, using which the reference gain values $R_{gain}$ and $B_{gain}$ computed and refined in the modified, grey world, process are further refined (step s503). In the case where the reference grey refinement process was arrived at without first performing a modified grey world process, the gain values $R_{gain}$ and $B_{gain}$ are computed from the original image, and the luminance and grey weights applied thereto, in this step (s503).

The luminance weights are calculated according to the following equation:

$$LW_i = 1 - \left(\frac{|L_i - \overline{L}|}{128}\right)^2,$$

where $L_i$ is the average intensity of the $i^{th}$ grey block, and $\overline{L}$ is the average intensity of the whole image.

Luminance weighting is used since grey blocks with a middle level of intensity are sensitive to a colour temperature of the light source, whereas white and black blocks are affected by the exposure value and hence do not make good references for computing a final $R_{gain}$ and $B_{gain}$.

The grey weights are calculated according to the following equation:

$$GW_i = 1 - GD_i^2,$$

where, $GD_i^2$ is the geometric distortion of the $i^{th}$ grey block.

Grey block detection and calculation is again performed at step s504 after $R_{gain}$ and $B_{gain}$, having been weighted by the luminance weights and grey weights, have been applied to the image. At step s505, if the number of grey blocks is less than a predetermined threshold $T_2$, the reference grey refinement process proceeds to step s506 where $R_{gain}$ and $B_{gain}$ are set to equal each other with a value of 1, and the reference grey refinement process ends. Setting $R_{gain}$ and $B_{gain}$ to 1 leaves the current white balancing settings unchanged. The settings are left unchanged in such case since the number of grey blocks is insufficient to allow meaningful refinement of the settings. Otherwise, the process proceeds to step s507 where a number of iterations of the reference grey refinement process having already been performed is determined. If the number of iterations exceeds a predetermined threshold of $T_1$, a process of false positive detection and dark region gain adjustment is commenced (step s508), otherwise, the reference grey refinement process returns to step s501 for a further iteration. If the number of iterations exceeds the predetermined threshold of $T_1$, it is determined that further meaningful refinement of $R_{gain}$ and $B_{gain}$ is exhausted.

Figure 5:
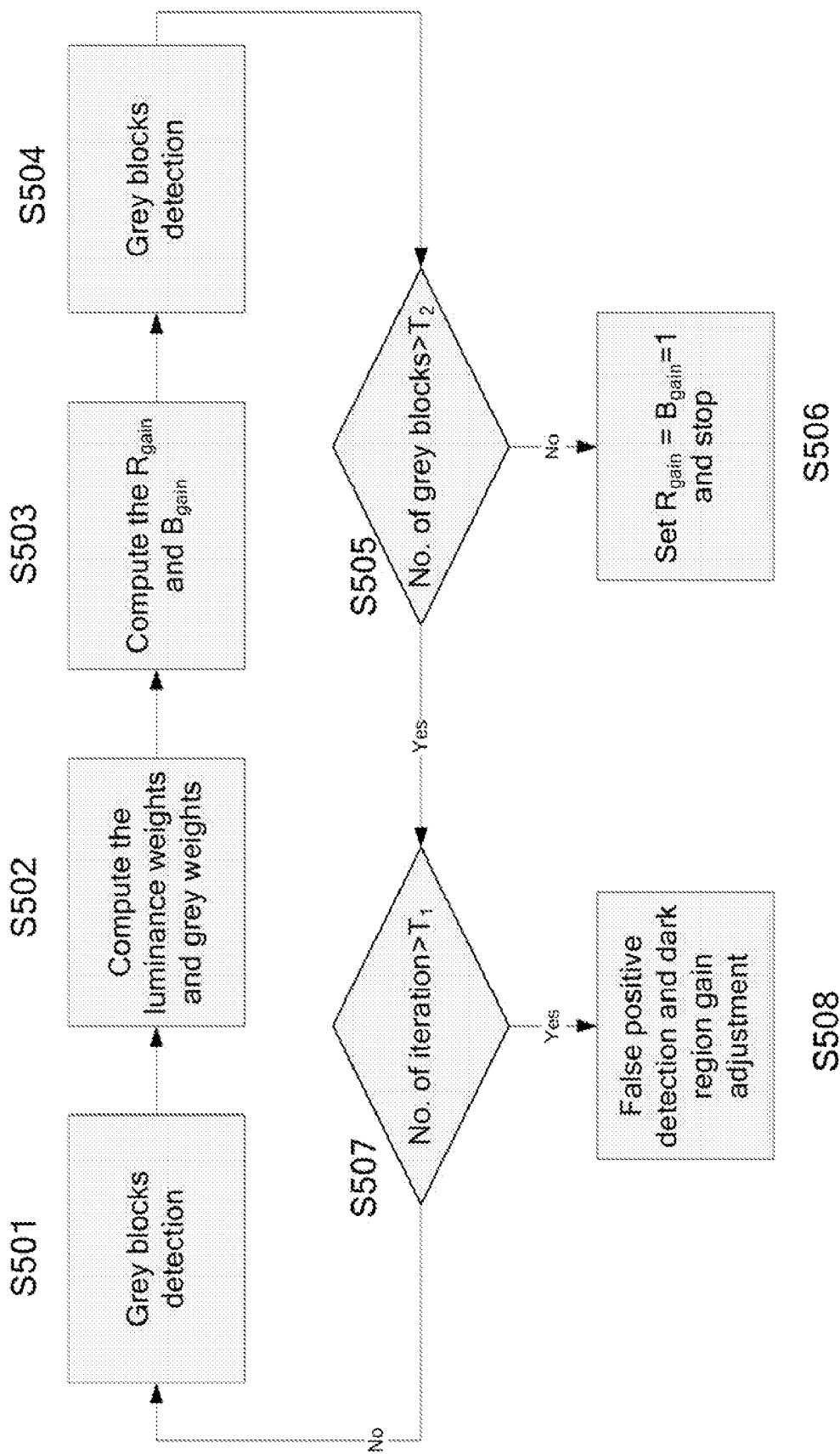
FIG. 5 is a flow diagram of a reference grey refinement process.

The values of $T_1$ and $T_2$ are empirically determined through, for example, prior testing of a large plurality of images having different light sources. In the example of FIG. 5, $T_1$ is exemplary set to 10, and $T_2$ is set to 5.

Figure 6:
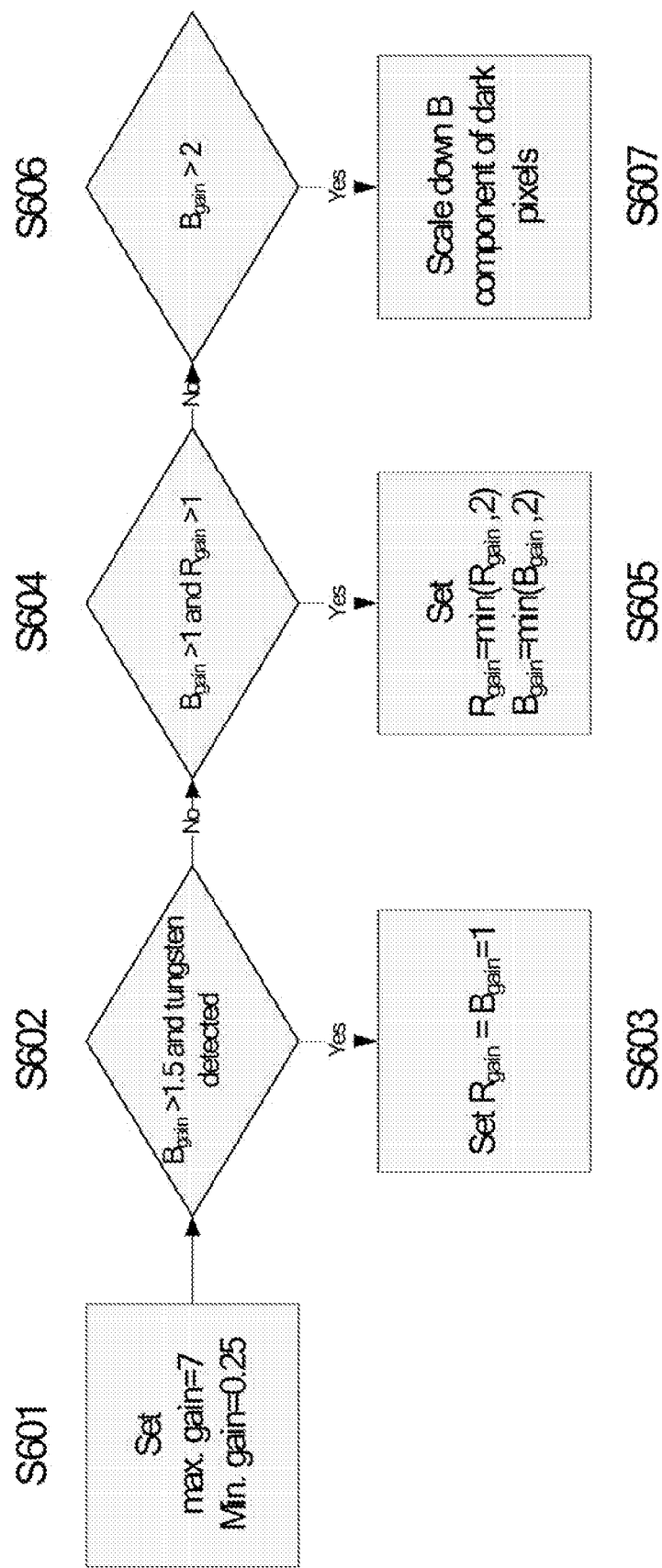
FIG. 6 is a flow diagram of a false positive detection and dark region gain adjustment process.

The process of false positive detection and dark region gain adjustment is described with reference to FIG. 6. At step s601, the maximum gain is set to a value of 7, and the minimum gain is set to a value of 0.25. The value of the maximum and minimum gains are empirically determined on the basis that even using very low colour temperature light sources, such as a tungsten light source, the maximum gain should be less than 7 and the minimum gain should be higher than 0.25. The value of $B_{gain}$ is then determined for the digital image (s602), and compared with a threshold value.

If $B_{gain}$ is larger than 1.5, it is determined that a tungsten light source, or similar, has been used, or that the image contains a large yellow object or skin tone. If it is detected that a tungsten light source was not used. $R_{gain}$ is set equal to $B_{gain}$, equal to a value of 1 (step s603). Detection of whether a tungsten light source was used can be performed at the time the histogram of the quantized hue domain of the original image is generated. A tungsten light source is detected if the variance of red regions of the histogram is larger than 20.

Otherwise, if $B_{gain}$ is not larger than 1.5, it is determined if both $B_{gain}$ and $R_{gain}$ are larger than 1, at step s604. If both $B_{gain}$ and $R_{gain}$ are larger than 1, the process proceeds to step s605 where $R_{gain}$ is set to the smaller of $R_{gain}$ or the value 2, and $B_{gain}$ is set to the smaller of $B_{gain}$ or the value 2. If both $B_{gain}$ and $R_{gain}$ do not exceed a value of 1, it is determined at step s606 if $B_{gain}$ exceeds a value of 2. If $B_{gain}$ exceeds 2, the B component of dark pixels is scaled down (step s607). By scaling down the B component of dark pixels, over estimation of $B_{gain}$ in dark pixels is prevented.

The modified grey world approach as disclosed above removes the effect of large objects in an image and provides a good estimation of white balance settings. By using a geometric distortion criteria to detect grey blocks, an intensity scale invariant measure for bright and dark regions of the image can be provided, since the ratios of green to red, and green to blue of a block are used as a measuring factor to estimate whether the block contains potential grey objects.

Transformation of the image to the hue domain and removal of a number of most frequently occurring colours reduces the effect of the colour saturation of the object on the accuracy of the process for removing large objects from the image. Removing a number of most frequently occurring colours further increases the colour variance of the image for better estimation of the white balance setting. The white balance settings are further refined by referencing grey blocks and using a geometric method to measure the greyness of blocks. False positive methods, such as shown in FIG. 6, prevent incorrect estimation of white balance settings when the image contains large objects and smooth backgrounds, whilst dark region adjustment reduces the sensitivity of dark pixels due to large gain.

Figure 7:
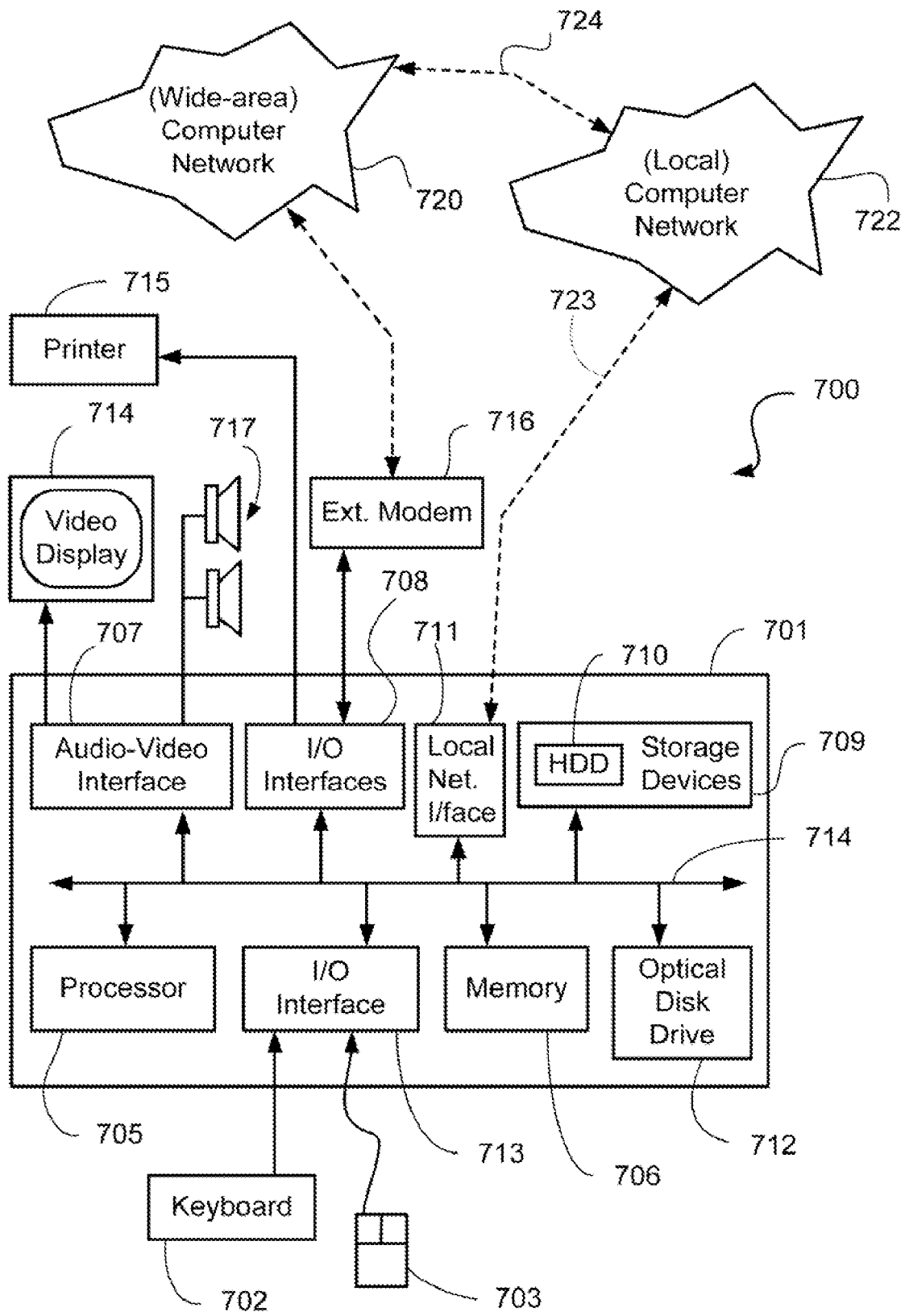
FIG. 7 is a schematic block diagram of a general purpose computer upon which the methods and processes hereinafter described can be practiced.

The methods of correcting white balance and computing gain values may be implemented using a computer system 700, such as that shown in FIG. 7 wherein the processes of FIGS. 1 to 6 may be implemented as software, such as one or more application programs executable within the computer system 700. In particular, the steps of the methods of correcting white balance and computing gain values are effected by instructions in the software that are carried out within the computer system 700. The instructions may be formed as one or more code modules, each for performing one or more particular tasks. The software may also be divided into two separate parts, in which a first part and corresponding code modules perform the white balance correction and gain value computation methods, and a second part and corresponding code modules manage a user interface between the first part and the user. The software may be stored in a computer readable medium, including the storage devices described below, for example. The software is loaded into the computer system 700 from the computer readable medium, and then executed by the computer system 700. A computer readable medium having such software or computer program recorded on it is a computer program product. The use of the computer program product in the computer system 700 preferably effects an advantageous apparatus for correcting the white balance of digital images, and computing gain values for correction of white balances.

As seen in FIG. 7, the computer system 700 is formed by a computer module 701, input devices such as a keyboard 702 and a mouse pointer device 703, and output devices including a printer 715, a display device 714 and loudspeakers 717. An external Modulator-Demodulator (Modem) transceiver device 716 may be used by the computer module 701 for communicating to and from a communications network 720 via a connection 721. The network 720 may be a wide-area network (WAN), such as the Internet or a private WAN. Where the connection 721 is a telephone line, the modem 716 may be a traditional "dial-up" modem. Alternatively, where the connection 721 is a high capacity (eg: cable) connection, the modem 716 may be a broadband modem. A wireless modem may also be used for wireless connection to the network 720.

The computer module 701 typically includes at least one processor unit 705, and a memory unit 706 for example formed from semiconductor random access memory (RAM) and read only memory (ROM). The module 701 also includes a number of input/output (I/O) interfaces including an audio-video interface 707 that couples to the video display 714 and loudspeakers 717, an I/O interlace 713 for the keyboard 702 and mouse 703 and optionally a joystick (not illustrated), and an interface 708 for the external modem 716 and printer 715. In some implementations, the modem 716 may be incorporated within the computer module 701, for example within the interface 708. The computer module 701 also has a local network interface 711 which, via a connection 723, permits coupling of the computer system 700 to a local computer network 722, known as a Local Area Network (LAN). As also illustrated, the local network 722 may also couple to the wide network 720 via a connection 724, which would typically include a so-called "firewall" device or similar functionality. The interlace 711 may be formed by an Ethernet™ circuit card, a wireless Bluetooth™ or an IEEE 802.21 wireless arrangement.

The interlaces 708 and 713 may afford both serial and parallel connectivity, the former typically being implemented according to the Universal Serial Bus (USB) standards and having corresponding USB connectors (not illustrated). Storage devices 709 are provided and typically include a hard disk drive (HDD) 710. Other devices such as a floppy disk drive and a magnetic tape drive (not illustrated) may also be used. An optical disk drive 712 is typically provided to act as a non-volatile source of data. Portable memory devices, such, optical, disks (eg: CD-ROM, DVD), USB-RAM, and floppy disks for example may then be used as appropriate sources of data to the system 700.

The components 705, to 713 of the computer module 701 typically communicate via an interconnected bus 704 and in a manner which results in a conventional mode of operation of the computer system 700 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 710 and read and controlled in execution by the processor 705. Intermediate storage of such programs and any data fetched from the networks 720 and 722 may be accomplished using the semiconductor memory 706, possibly in concert with the hard disk drive 710. In some instances, the application programs may be supplied to the user encoded on one or more CD-ROM and read via the corresponding drive 712, or alternatively may be read by the user from the networks 720 or 722. Still further, the software can also be loaded into the computer system 700 from other computer readable media. Computer readable media refers to any storage medium that participates in providing instructions and/or data to the computer system 700 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 714. Through manipulation of the keyboard 702 and the mouse 703, a user of the computer system 700 and the application may manipulate the interface to provide controlling commands and/or input to the applications associated with the GUI(s).

The methods of correcting white balance and computing gain values for correcting white balance may alternatively be implemented in dedicated hardware such as one or more integrated circuits. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive.

We claim:

1. A method of correcting white balance in a digital image, the method comprising:
   determining a number of grey blocks in the digital image according to geometric distortion criteria, each block comprising a subset of the plurality of pixels of the image, said number of determined blocks being less than a predetermined value;
   processing the digital image to generate an intermediate image;
   determining a number of grey blocks in the intermediate image according to the geometric distortion criteria;
   scaling one or more colour channels of the intermediate image by respective reference gain values derived in accordance with a grey world process performed on the intermediate image; and
   applying the respective reference gain values to the intermediate image, whereby an image with a corrected white balance is obtained.

2. The method according to claim 1, further comprising refining the respective reference gain values before applying the respective reference gain values to the intermediate image.

3. The method according to claim 1, wherein processing the digital image to generate an intermediate image comprises:
   scaling one or more colour channels of the digital image by respective first gain values to generate a first intermediate image;
   scaling one or more colour channels of the digital image by respective second gain values to generate a second intermediate image;
   determining a number of grey blocks in each of the first and second intermediate image, in accordance with the geometric distortion criteria; and
   selecting either the first or second gain values as the reference gain values, in accordance with the determination of which of the first or second intermediate images comprises a greater number of grey blocks.

4. The method according to claim 2, wherein refining the respective reference gain values comprises:
   determining the number of grey blocks in the intermediate image;
   computing luminance weights and grey weights;
   applying the luminance weights and grey weights to the respective reference grey values to obtain a further intermediate image;
   determining the number of grey blocks in the further intermediate image; and
   determining if the number of grey blocks exceeds a second predetermined value.

5. The method according to claim 4, wherein if the number of grey blocks does not exceed the second predetermined value, a gain value of the B channel and a gain value of the R channel are set to 1.

6. The method according to claim 4, wherein if the number of grey blocks exceeds the second predetermined value, a number of iterations of refining the respective reference gain values is determined.

7. The method according to claim 6, wherein if the number of iterations exceeds a third predetermined value, a false positive detection and gain adjustment process for further refining the respective reference gain values is performed.

8. The method according to claim 6, wherein if the number of iterations does not exceed a third predetermined value, refining the respective reference gain values is re-iterated.

9. The method according to claim 4, wherein each of the luminance weights is calculated according to the following equation:

$$LW_i = 1 - \left(\frac{|L_i - \bar{L}|}{128}\right)^2,$$

where $L_i$ is the average intensity of the $i^{th}$ gray block, and $\bar{L}$ is the average intensity of the digital image.

10. The method according to claim 4, wherein each of the grey weights is calculated according to the following equation:

$$GW_i = 1 - GD_i^2,$$

where $GD_i^2$ is the geometric distortion of the $i^{th}$ gray block.

11. The method according to claim 1, wherein the geometric distortion criteria are:

$$\left|\frac{G_i}{R_i} - 1\right| + \left|\frac{G_i}{B_i} - 1\right| \le T_g$$

where
$R_i$ is the accumulated value of a R channel of the image,
$G_i$ is the accumulated value of a G channel of the image,
$B_i$ is the accumulated value of a B channel of the image, and
$T_g$ is an empirically determined threshold,
and a block is grey if the geometric distortion criteria are satisfied.

12. The method according to claim 3, wherein a first gain value for scaling a B channel of the digital image is calculated as follows:

$$B_{gain} = \frac{\text{median}(G_i)}{\text{median}(B_i)},$$

where
$G_i$ is the accumulated value of a G channel of the image, and
$B_i$ is the accumulated value of a B channel of the image.

13. The method according to claim 3, wherein a first gain value for scaling an R channel of the digital image is calculated as follows:

$$R_{gain} = \frac{\text{median}(G_i)}{\text{median}(R_i)},$$

where
$R_i$ is the accumulated value of a R channel of the image, and
$G_i$ is the accumulated value of a G channel of the image.

14. The method according to claim 3, wherein a second gain value for scaling a B channel of the digital image is calculated as follows:

$$B_{gain} = \frac{\text{mean}(G_i)}{\text{mean}(B_i)},$$

where
$G_i$ is the accumulated value of a G channel of the image, and
$B_i$ is the accumulated value of a B channel of the image.

15. The method according to claim 3, wherein a second gain value for scaling an R channel of the digital image is calculated as follows:

$$R_{gain} = \frac{\text{mean}(G_i)}{\text{mean}(R_i)},$$

where
$R_i$ is the accumulated value of a R channel of the image, and
$G_i$ is the accumulated value of a G channel of the image.

16. An apparatus for correcting white balance in a digital image, the apparatus comprising:
    means for determining a number of grey blocks in the digital image according to geometric distortion criteria, each block comprising a subset of the plurality of pixels of the image, said number of determined blocks being less than a predetermined value;
    processing means for generating an intermediate image;
    means for determining a number of grey blocks in the intermediate image according to the geometric distortion criteria;
    scaling means for scaling one or more colour channels of the intermediate image by respective reference gain values derived in accordance with a grey world process performed on the intermediate image; and
    means for applying the respective reference gain values to the intermediate image, whereby an image with a corrected white balance is obtained.

17. A computer readable storage medium having recorded thereon a computer program for correcting white balance in a digital image, said computer readable storage medium comprising:
    code for determining a number of grey blocks in the digital image according to geometric distortion criteria, each block comprising a subset of the plurality of pixels of the image, said number of determined blocks being less than a predetermined value;
    code for processing the digital image to generate an intermediate image;
    code for determining a number of grey blocks in the intermediate image according to the geometric distortion criteria;
    code for scaling one or more colour channels of the intermediate image by respective reference gain values derived in accordance with a grey world process performed on the intermediate image; and
    code for applying the respective reference gain values to the intermediate image, whereby an image with a corrected white balance is obtained.

* * * * *